US011421574B2

(12) United States Patent
Diouf et al.

(10) Patent No.: US 11,421,574 B2
(45) Date of Patent: Aug. 23, 2022

(54) METHOD FOR INJECTING GASEOUS AMMONIA INTO A COMBUSTION ENGINE EXHAUST LINE

(71) Applicant: VITESCO TECHNOLOGIES GMBH, Hannover (DE)

(72) Inventors: Cheikh Diouf, Toulouse (FR); Mathieu Dupriez, Toulouse (FR); Charles-Albert Fischbach, Toulouse (FR)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/428,218

(22) PCT Filed: Feb. 4, 2020

(86) PCT No.: PCT/EP2020/052711
§ 371 (c)(1),
(2) Date: Aug. 3, 2021

(87) PCT Pub. No.: WO2020/161114
PCT Pub. Date: Aug. 13, 2020

(65) Prior Publication Data
US 2022/0106895 A1    Apr. 7, 2022

(30) Foreign Application Priority Data
Feb. 4, 2019   (FR) ...................................... 1901057

(51) Int. Cl.
*F01N 3/20* (2006.01)
(52) U.S. Cl.
CPC .......... *F01N 3/208* (2013.01); *F01N 2570/14* (2013.01); *F01N 2610/02* (2013.01);
(Continued)

(58) Field of Classification Search
CPC combination set(s) only.
See application file for complete search history.

(56) References Cited

U.S. PATENT DOCUMENTS 6,928,807 B2   8/2005  Jacob et al.
8,151,779 B1 * 4/2012  Hagiwara ........... F02D 19/0665
                                                         123/575
(Continued)

FOREIGN PATENT DOCUMENTS

CA            3031405   *  1/2018   ........ H01M 8/04089
DE   10 2007 022 678      11/2008
(Continued)

OTHER PUBLICATIONS

International Search Report and Written Opinion of the ISA for PCT/EP2020/052711 dated Mar. 6, 2020, 11 pages.

*Primary Examiner* — Binh Q Tran
(74) *Attorney, Agent, or Firm* — Nixon & Vanderhye

(57) ABSTRACT

Disclosed is a device for injecting ammonia in gaseous form into an exhaust line of a combustion engine, the device including a supervisor, an evaporation chamber incorporating a heater for heating a quantity of reducing agent thus releasing ammonia in gaseous form that exits the evaporation chamber via a pipe opening into the exhaust line. The control supervisor is associated with an internal first pressure sensor housed in the evaporation chamber and with a second pressure sensor intended to be housed in the exhaust line, including a calculator calculating a quantity of ammonia to be injected into the exhaust line at a given instant as a function of the pressure values from the first and second pressure sensors.

20 Claims, 1 Drawing Sheet

(52) U.S. Cl.
CPC ...... *F01N 2610/06* (2013.01); *F01N 2610/10* (2013.01); *F01N 2610/146* (2013.01); *F01N 2900/0601* (2013.01); *F01N 2900/08* (2013.01); *F01N 2900/1406* (2013.01); *F01N 2900/1411* (2013.01); *F01N 2900/1808* (2013.01); *F01N 2900/1811* (2013.01); *F01N 2900/1818* (2013.01)

(56) References Cited

U.S. PATENT DOCUMENTS

| | | | |
|---|---|---|---|
| 8,240,277 B1 * | 8/2012 | Michikawauchi | ............................ F02M 21/0287 123/1 A |
| 8,418,443 B2 | 4/2013 | Millet et al. | |
| 2007/0056264 A1 * | 3/2007 | Hou | ........................ F01N 9/005 60/274 |
| 2008/0066452 A1 * | 3/2008 | Oberski | ............. B01D 53/9431 60/281 |
| 2014/0060015 A1 * | 3/2014 | Yan | ........................ F01N 11/00 137/341 |
| 2019/0234271 A1 * | 8/2019 | Volmerding | ............ F01N 3/208 |

FOREIGN PATENT DOCUMENTS

| | | |
|---|---|---|
| EP | 1 338 562 | 8/2003 |
| EP | 2 333 262 | 6/2011 |
| FR | 2 953 737 | 6/2011 |

* cited by examiner

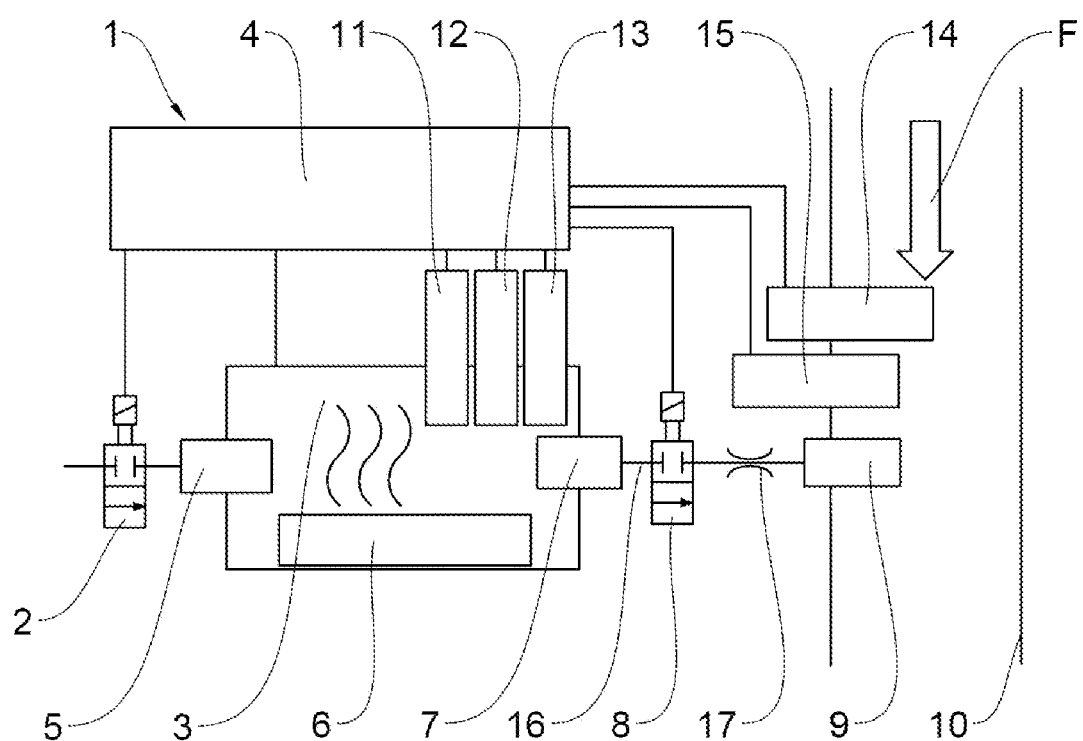

METHOD FOR INJECTING GASEOUS AMMONIA INTO A COMBUSTION ENGINE EXHAUST LINE

This application is the U.S. national phase of International Application No. PCT/EP2020/052711 filed Feb. 4, 2020 which designated the U.S. and claims priority to FR Patent Application No. 1901057 filed Feb. 4, 2019, the entire contents of each of which are hereby incorporated by reference.

BACKGROUND OF THE INVENTION

Field of the Invention

The present invention relates to a method for injecting ammonia in gaseous form into a combustion engine exhaust line and to a device for injecting ammonia in gaseous form into a combustion engine exhaust line, the device implementing such an injection method.

Such a device comprises a control supervisor, an evaporation chamber incorporating heating means for heating a quantity of reducing agent thus releasing ammonia in gaseous form that exits the evaporation chamber via a pipe opening into the exhaust line.

Description of the Related Art

More than 95% of diesel engines will, in the near future, be equipped with a device for the treatment of nitrogen oxides in the exhaust line. This could also apply in the more distant future to gasoline fueled engines.

In order to do this, in motor vehicles, in particular with compression-ignition engines, notably running on diesel fuel, it is known to equip a heat engine exhaust line with a selective catalytic reduction system having injection of reducing agent into the line, the monitoring-control unit receiving the estimates or measurements of amounts of nitrogen oxides exiting through the exhaust line at least downstream of the selective catalytic reduction system.

For the removal of nitrogen oxides or NOx, a selective catalytic reduction (SCR) system is therefore frequently used. Subsequently, in the present patent application, the selective catalytic reduction system may also be mentioned by its abbreviation SCR, just as the nitrogen oxides may be mentioned under their abbreviation NOx and ammonia under its chemical formula $NH_3$.

In an SCR system, use is often made of a liquid reducing agent intended to be introduced in predefined amounts and by consecutive injections into an exhaust line of a motor vehicle.

The addition of this decontaminating reducing agent carries out the treatment of the NOx present in the exhaust line of the combustion engine of the motor vehicle. This SCR reducing agent is frequently ammonia or an ammonia precursor, for example urea or a urea derivative, in particular a mixture known under the Adblue® brand name.

An SCR system typically has a tank containing a quantity of liquid reducing agent, a pump for supplying liquid reducing agent to an exhaust line of a motor vehicle using an injector that opens into the exhaust line.

The liquid reducing agent decomposes into ammonia in gaseous form, of chemical formula $NH_3$. The $NH_3$ is stored in an SCR catalytic converter in order to reduce the NOx that are in the gases discharged by the exhaust line.

An SCR system, more particularly when the reducing agent is a urea derivative such as AdBlue®, is effective between medium and high temperatures and may convert the NOx continuously. An optimized control is also required for increasing the NOx treatment efficiency and optimizing the consumptions of fuel and of reducing agent, given that these parameters are all dependent, nonlinearly, on the conditions prevailing in the exhaust and during the catalysis.

The control of an SCR system may be divided into two parts: a nominal control and an adaptive control. The nominal control sets the amount of reducing agent to be injected which is calibrated as a function of the SCR system and of the test vehicle used during the development. The adaptive control sets a multiplying correction factor for the amount of reducing agent to be injected based for the vehicle on which the SCR system is actually associated, in order to adapt the system in series-production so as to suit deviations and spreads that may originate from the reducing agent injector, from the NOx sensors, from the quality of reducing agent, from the metering system, from the catalysis temperature or from the exhaust flow rate, etc.

It should also be taken into account that the system may have an influence on the reduction process by giving rise to more emissions of NOx or of NH3, the NH3 corresponding to reducing agent converted but not used for the catalysis at the outlet of the exhaust line.

Generally, the adaptive control uses an NH3 sensor and/or NOx sensor or works with an estimate at the outlet of an SCR-impregnated particulate filter or of an SCR catalytic converter, this without taking into account the case where an auxiliary SCR system is present or if there is present a catalytic converter for oxidation of the excess NH3 not used for the monitoring of the catalysis at the end of the exhaust line in order to avoid releasing NH3 into the environment outside of the motor vehicle.

A control of an SCR system according to the prior art enables an adaptation of a predetermined NOx treatment efficiency according to a volume ratio or a weight concentration or a level of NOx in the exhaust line, for example a mass flow rate in grams/second.

The most widespread SCR systems operate with a liquid reducing agent with or without the addition of air. An SCR system with the addition of air has the disadvantage of not guaranteeing an injection of agent when the combustion engine is under heavy load. An SCR system without the addition of air carries the risk of liquid and then solid deposits of reducing agent as a result of poor vaporization of the reducing agent at low temperatures.

Document FR-A-2 953 737 describes a method for treating pollutants contained in exhaust gases, particularly of a combustion engine. Selective catalytic reduction means through which the gases pass, and means for injecting a reducing agent into the exhaust line in order to treat said pollutants as they pass through catalysis means are provided in said line at the outlet from the combustion engine.

The method comprises the step of heating an organo-nitrated compound in order to cause it to break down into a mixture of at least a gaseous-phase reducing agent containing ammonia, and another gaseous-phase reducing agent, as well as water vapor.

The method then comprises the step of compressing and cooling this mixture in order to condense the water vapor into a liquid phase and obtain a gaseous phase of one of the two reducing agents and a liquid phase of the other reducing agent.

Finally, the method comprises the step of injecting one of the reducing agents into the exhaust line, in combination with at least the selective catalytic reduction means in order to treat the pollutants with these gases.

That document gives no indication as to how the injection is performed in such a way that the quantity of ammonia injected into the exhaust line is metered accurately.

As a result, the problem underlying the invention is that of designing a system for reducing the nitrogen oxides present in the exhaust gases discharged from a combustion engine by an exhaust line which does not have the aforementioned disadvantages by planning to inject ammonia into the exhaust line in gaseous form and by precisely controlling the quantity of ammonia in gaseous form injected.

SUMMARY OF THE INVENTION

To this end, the present invention relates to a method for injecting ammonia in gaseous form into a combustion engine exhaust line, a reducing agent being heated in an evaporation chamber so as to release ammonia in gaseous form which is thereafter introduced into the exhaust line by a pipe at the outlet of the evaporation chamber, notable in that, with the pressure in the evaporation chamber and the pressure of the exhaust gases in the exhaust line being measured or estimated, a quantity Q of ammonia is injected in gaseous form into the exhaust line at a given instant and is estimated in accordance with the following equation:

$$Q=[\sqrt{(P1-P2)/K}] \quad \text{[Math. 1]}$$

P1 being the pressure prevailing in the evaporation chamber, P2 the prevailing pressure of the exhaust gases in the exhaust line and K a constant dependent on a cross section of the pipe and on a density of the quantity of ammonia in gaseous form injected into the exhaust line.

It is important to know precisely the quantity of ammonia in gaseous phase that is entering the exhaust line. This quantity of ammonia is a function of the square root of the ratio of a pressure differential inside the evaporation chamber and inside the exhaust line divided by a constant K which is a function of a cross section of the pipe carrying the ammonia in gaseous form from the evaporation chamber into the exhaust line.

Because of the pressure differential, a Venturi effect is created, drawing the ammonia contained in the pipe into the exhaust line.

Unlike in a conventional SCR system, it is not the reducing agent that is introduced into the exhaust line, but ammonia in gaseous form. In a system according to the prior art, the conversion of the reducing agent into ammonia inside the exhaust line could be incomplete because of an excessively low temperature of the exhaust gases in the line, and this is something that is avoided by the method according to the invention.

In addition, there is no risk of reducing agent being deposited in the pipe nor of this pipe bursting if the motor vehicle remains motionless for a prolonged period of time at very cold outside temperatures as a result of the freezing of the reducing agent that the pipe contains, thereby improving the safety and maintenance of the injection device by no longer requiring the pipe and the injector to be purged.

In addition, the ammonia in gaseous and hot form reacts more quickly with the nitrogen oxides inside the exhaust line than is the case with an SCR system according to the prior art as no chemical conversion of the reducing agent is required.

Advantageously, a temperature in the evaporation chamber is measured and controlled so that it is greater than a conversion temperature at which the reducing agent can convert into ammonia at the measured or estimated pressure prevailing in the evaporation chamber.

Thus, ammonia in gaseous form is always obtained in the evaporation chamber and ready to perform reduction of the nitrogen oxides when a quantity of ammonia is injected into the exhaust line under the suction caused by the pressure differential between the evaporation chamber and the pressure of the exhaust gases in the line.

Advantageously, a concentration of ammonia in gaseous form in the evaporation chamber is measured or estimated, and when this concentration of ammonia in gaseous form is below a minimum concentration, reducing agent is reintroduced into the evaporation chamber.

This makes it possible to ensure a regular supply of reducing agent to the evaporation chamber in order to obtain ammonia in gaseous form.

Advantageously, a flow rate of exhaust gas is measured or estimated in the exhaust line, the nitrogen oxides discharged from the combustion engine into the exhaust line being estimated as a function of this measured or estimated flow rate, a total quantity of ammonia in gaseous form being estimated in a determined time interval for reducing the quantity of nitrogen oxides discharged during this time interval in the exhaust line, the total quantity of ammonia in gaseous form being injected as a succession of quantities of ammonia in gaseous form at given instants in the time interval.

The invention relates to a device for injecting ammonia in gaseous form into an exhaust line of a combustion engine, the device comprising a control supervisor, an evaporation chamber incorporating heating means for heating a quantity of reducing agent thus releasing ammonia in gaseous form that exits the evaporation chamber via a pipe opening into the exhaust line, the device implementing such a method, notable in that the control supervisor is associated with an internal first pressure sensor housed in the evaporation chamber and with a second pressure sensor intended to be housed in the exhaust line, comprising calculation means for calculating a quantity of ammonia to be injected into the exhaust line at a given instant as a function of the pressure values from the first and second pressure sensors.

Advantageously the supervisor is associated with a temperature sensor and with an ammonia sensor which are housed in the evaporation chamber, the supervisor being associated with a mass flow rate sensor for sensing the mass flow rate of the exhaust gases and which is intended to be housed in the exhaust line and estimating means for estimating the flow rate of nitrogen oxides in the line on the basis of the mass flow rate or comprising a model for estimating a flow rate of nitrogen oxides as a function of operating parameters of a combustion engine, these parameters comprising at least an engine speed and an engine torque.

Advantageously, the outlet pipe comprises a communication interface communicating with the evaporation chamber, a metering valve downstream of the communication interface and controlled by actuating means under the control of the supervisor so as to deliver a quantity of ammonia to be injected at a given instant and a restriction on the pipe downstream of the metering valve, a cross section of the restriction being considered to be the cross section of the pipe and the supervisor comprises estimating means for estimating the density of the quantity of ammonia in gaseous form that is injected into the exhaust line as a function of the temperature measured by the temperature sensor in the evaporation chamber.

Advantageously, the pipe is intended to open into the exhaust line via a passive injector.

Advantageously, the supervisor comprises actuating means for actuating a metering valve for metering reducing agent into the evaporation chamber, the reducing agent metering valve being positioned upstream of an inlet interface for entry into the evaporation chamber.

Advantageously, the heating means for heating the evaporation chamber are electrical heating means and the reducing agent is a mixture of water and of urea.

BRIEF DESCRIPTION OF THE DRAWINGS

Further features, aims and advantages of the present invention will become apparent from reading the following detailed description, and with reference to the accompanying drawing, which is provided by way of non-limiting example, and in which:

FIG. 1 is a diagrammatic representation of a view of a device for injecting ammonia in gaseous form into a combustion engine exhaust line according to one embodiment according to the present invention.

DESCRIPTION OF THE PREFERRED EMBODIMENTS

With reference to FIG. 1, the present invention relates to a method for injecting ammonia in gaseous form into a combustion engine exhaust line 10. Exhaust gases pass through the exhaust line 10 on leaving the combustion engine in the direction indicated by the arrow F.

In this method, a reducing agent, advantageously an ammonia-precursor reducing agent, being urea or a urea derivative, notably a mixture known by the brand name AdBlue®, is heated in an evaporation chamber 3 in order to release ammonia in gaseous form.

This ammonia in gaseous form or NH3 is then introduced into the exhaust line 10 by a pipe 16 at the outlet of the evaporation chamber 3.

The quantity of ammonia in gaseous form that is injected is dependent on the difference in pressure between the pressure prevailing, on the one hand, in the evaporation chamber 3 and, on the other hand, in the exhaust line 10.

According to the invention, the pressure in the evaporation chamber 3 and the pressure of the exhaust gases in the exhaust line 10 are measured or estimated, advantageously measured. A quantity Q of ammonia is injected in gaseous form into the exhaust line 10 at a given instant, this quantity being estimated in accordance with the following equation:

$$Q=\sqrt{[(P1-P2)/K]}$$ [Math. 1]

The quantity Q of ammonia in gaseous form is the quantity of ammonia equal to the square root of the ratio of difference in pressure between the pressure prevailing in the evaporation chamber 3 and the prevailing pressure of the exhaust gases in the exhaust line 10 divided by a constant K.

In this equation, P1 is the pressure prevailing in the evaporation chamber 3, P2 the prevailing pressure of the exhaust gases in the exhaust line 10, and K a constant dependent on a cross section of the pipe 16 and on a density of the quantity of ammonia in gaseous form injected into the exhaust line 10.

The monitoring of the temperature in the evaporation chamber 3 is important so as to control the temperature in the evaporation chamber 3 to ensure that it is at a value sufficiently high that there is always ammonia present in the gaseous phase having been obtained following thermolysis and hydrolysis of the urea.

The formation of the NH3 reducing compound from the reducing agent, frequently a product known by the name of AdBlue® which is a mixture of 32.5% urea and of water, occurs in two steps.

The first step is the thermolysis of the urea according to the following chemical reaction $$(NH_2)_2CO \rightarrow NH_3 + HNCO$$ [Math. 2]

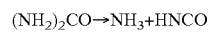

The second step is the hydrolysis of the isocyanic acid according to the following chemical reaction:

$$HNCO + H_2O \rightarrow NH_3 + CO_2$$ [Math. 3]

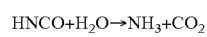

These two steps, and especially the first one, require temperatures of at least 180° to 200° C.

A temperature in the evaporation chamber 3 may be measured and controlled so that it is greater than a conversion temperature at which the reducing agent can convert into ammonia at the measured or estimated pressure prevailing in the evaporation chamber 3.

Preferably, the temperature and pressure prevailing in the evaporation chamber 3 may be measured by a temperature sensor 11 and a pressure sensor 12, as shown in FIG. 1.

To replace the gaseous-form ammonia consumed in the exhaust line 10, a concentration of ammonia in gaseous form in the evaporation chamber 3 can be measured or estimated. Preferably, the concentration of ammonia in gaseous form may be measured by an ammonia sensor 13, as shown in FIG. 1.

When this concentration of ammonia in gaseous form is below a minimum concentration, reducing agent may be reintroduced into the evaporation chamber 3, this being from a tank of reducing agent sited some distance away from the evaporation chamber 3, that tank not being shown in FIG. 1.

In order to calculate the quantity Q of ammonia in gaseous form introduced at a given instant, a flow rate of exhaust gas in the exhaust line 10 may be measured or estimated.

In a first alternative, an estimate of the nitrogen oxides discharged from the combustion engine into the exhaust line 10 may be performed as a function of this measured flow rate by using the first equation set out hereinabove, this being done in a determined time interval in order to reduce the quantity of nitrogen oxides discharged during this time interval.

In a second alternative, a total quantity of ammonia in gaseous form for reducing the nitrogen oxides may be estimated in a determined time interval for reducing the quantity of nitrogen oxides discharged into the exhaust line 10 during this time interval.

For these two alternatives, the total quantity of ammonia in gaseous form can be injected as a succession of quantities of ammonia in gaseous form at given instants in the time interval.

The invention relates to a device 1 for injecting ammonia in gaseous form into an exhaust line 10 of a combustion engine. The injection device 1 comprises a control supervisor 4, an evaporation chamber 3 incorporating heating means 6 for heating a quantity of reducing agent thus releasing ammonia in gaseous form.

The ammonia in gaseous form leaves the evaporation chamber 3 via a pipe 16 opening into the exhaust line 10.

The injection device 1 implements a method as described hereinabove. In order to do so, the control supervisor 4 is associated with an internal first pressure sensor 12 housed in the evaporation chamber 3 and with a second pressure sensor 14 intended to be housed in the exhaust line 10.

As mentioned previously, the pressure in the exhaust line 10 may also be estimated by being supplied by the engine control electronic unit which calculates it on the basis of the current operating parameters of the combustion engine.

That allows the pressure prevailing in the evaporation chamber 3 and the prevailing pressure of the exhaust gases in the exhaust line 10 to be measured simultaneously.

The control supervisor 4 incorporates calculation means for calculating a quantity of ammonia to be injected at a given instant into the exhaust line 10 as a function of the pressure values from the first and second pressure sensors 12, 14, this being performed according to the first equation mentioned hereinabove, incorporating also the constant K.

In addition, the supervisor 4 may be associated with a temperature sensor 11 and with an ammonia sensor 13 which are housed in the evaporation chamber 3. In addition, the supervisor 4 may be associated with a mass flow rate sensor 15 for sensing the mass flow rate of the exhaust gases and which is intended to be housed in the exhaust line 10 and comprising estimating means for estimating the flow rate of nitrogen oxides in the line 10 on the basis of the mass flow rate, this being a first optional embodiment.

In a second optional embodiment, the supervisor 4 comprises a model for estimating a flow rate of nitrogen oxides as a function of operating parameters of a combustion engine, these parameters comprising at least an engine speed and an engine torque, this model being a model of the exhaust gas emissions that takes account of the operating parameters.

The model may be corrected using measurements from a nitrogen oxide probe present in the exhaust line 10.

Specifically, if the quantity of nitrogen oxides leaving the engine is underestimated by the model, the supervisor 4 commands an under-injection of ammonia in gaseous form, which leads to the SCR post-treatment system of which the device 1 forms part not being effective enough to conform to the pollution-control standards.

In the case where the quantity of nitrogen oxides leaving the engine is overestimated by the model, the supervisor 4 commands an over-injection of ammonia in gaseous form, leading to ammonia being released at the outlet of the exhaust.

The estimation model may be calibrated on a nominal engine and not take account of the peculiarities of the combustion engine specific to the motor vehicle, and notably the ageing or drift in settings thereof. However, with the spread of the engines produced and the ageing of these engines the estimation error may be significant. Thus, it is sensible to correct the estimation model if need be, this being done through a learning process.

The outlet pipe 16 may comprise a communication interface 7 interfacing with the evaporation chamber 3, positioned on the wall of the evaporation chamber 3 and locally passing through same.

The outlet pipe 16 may then comprise a metering valve 8 downstream of the communication interface 7 and controlled by actuating means under the control of the supervisor 4 so as to deliver a quantity of ammonia in gaseous form that is to be injected at a given instant, this being as a function of the difference in pressure in the evaporation chamber 3 and in the exhaust line 10, as estimated according to the first equation mentioned hereinabove.

The outlet pipe 16 may finally comprise a restriction 17 on the pipe 16 downstream of the metering valve 8. This restriction 17 influences the value of the constant K in the first equation. A cross section of the restriction is then taken as being the cross section of the pipe 16 in the first equation.

To calculate the constant K, the supervisor 4 may additionally comprise means for estimating the density of the quantity of ammonia in gaseous form injected into the exhaust line 10 as a function of the temperature measured by the temperature sensor 11 in the evaporation chamber 3.

Because of the presence of the metering valve 8 upstream of the injector 9, which forms the interface between the pipe 16 and the exhaust line 10, the pipe 16 can open into the exhaust line 10 via a passive injector 9, which is to say an injector which exerts no control over the flow rate of ammonia in gaseous form passing through it.

Upstream of the evaporation chamber 3 in the injection device 1, the supervisor 4 may comprise actuating means for actuating a metering valve 2 for metering reducing agent into the evaporation chamber 3. The reducing agent metering valve 2 may thus be positioned upstream of an inlet interface 5 for entry into the evaporation chamber 3.

The heating means 6 the heating the evaporation chamber 3 may be electrical heating means 6.

The invention is in no way limited to the embodiments described and illustrated, which have been given solely by way of example.

The invention claimed is:

1. A method for injecting ammonia in gaseous form into a combustion engine exhaust line, a reducing agent being heated in an evaporation chamber so as to release ammonia in gaseous form which is thereafter introduced into the exhaust line by a pipe at the outlet of the evaporation chamber, wherein, with the pressure in the evaporation chamber and the pressure of the exhaust gases in the exhaust line being measured or estimated, a quantity Q of ammonia is injected in gaseous form into the exhaust line at a given instant and estimated in accordance with the following equation:

$$Q=\sqrt{[(P1-P2)/K]} \qquad [\text{Math. 1}]$$

P1 being the pressure prevailing in the evaporation chamber, P2 the prevailing pressure of the exhaust gases in the exhaust line and K a constant dependent on a cross section of the pipe and on a density of the quantity of ammonia in gaseous form injected into the exhaust line.

2. The method as claimed in claim 1, wherein a temperature in the evaporation chamber is measured and controlled so that the temperature is greater than a conversion temperature at which the reducing agent can convert into ammonia at the measured or estimated pressure prevailing in the evaporation chamber.

3. The method as claimed in claim 2, wherein a concentration of ammonia in gaseous form in the evaporation chamber is measured or estimated, and when this concentration of ammonia in gaseous form is below a minimum concentration, reducing agent is reintroduced into the evaporation chamber.

4. The method as claimed in claim 1, wherein a flow rate of exhaust gas is measured or estimated in the exhaust line, the nitrogen oxides discharged from the combustion engine into the exhaust line being estimated as a function of this measured or estimated flow rate, a total quantity of ammonia in gaseous form being estimated in a determined time interval for reducing the quantity of nitrogen oxides discharged during this time interval in the exhaust line, the total quantity of ammonia in gaseous form being injected as a succession of quantities of ammonia in gaseous form at given instants in the time interval.

5. A device for injecting ammonia in gaseous form into an exhaust line of a combustion engine, the device comprising a control supervisor, an evaporation chamber incorporating heating means for heating a quantity of reducing agent thus releasing ammonia in gaseous form that exits the evaporation chamber via a pipe opening into the exhaust line, the device implementing a method as claimed in claim 1, wherein the control supervisor is associated with an internal first pressure sensor housed in the evaporation chamber and with a second pressure sensor intended to be housed in the exhaust line, comprising calculation means for calculating a quantity of ammonia to be injected into the exhaust line at a given instant as a function of the pressure values from the first and second pressure sensors.

6. The device as claimed in claim 5, wherein the supervisor is associated with a temperature sensor and with an ammonia sensor which are housed in the evaporation chamber, the supervisor being associated with a mass flow rate sensor for sensing the mass flow rate of the exhaust gases and which is intended to be housed in the exhaust line and estimating means for estimating the flow rate of nitrogen oxides in the line on the basis of the mass flow rate or comprising a model for estimating a flow rate of nitrogen oxides as a function of operating parameters of a combustion engine, these parameters comprising at least an engine speed and an engine torque.

7. The device as claimed in claim 6, wherein the outlet pipe comprises a communication interface communicating with the evaporation chamber, a metering valve downstream of the communication interface and controlled by actuating means under the control of the supervisor so as to deliver a quantity of ammonia to be injected at a given instant and a restriction on the pipe downstream of the metering valve, a cross section of the restriction being considered to be the cross section of the pipe and the supervisor comprises estimating means for estimating the density of the quantity of ammonia in gaseous form that is injected into the exhaust line as a function of the temperature measured by the temperature sensor in the evaporation chamber.

8. The device as claimed in claim 6, wherein the pipe is intended to open into the exhaust line via a passive injector.

9. The device as claimed in claim 6, wherein the supervisor comprises actuating means for actuating a metering valve for metering reducing agent into the evaporation chamber, the reducing agent metering valve being positioned upstream of an inlet interface for entry into the evaporation chamber.

10. The device as claimed in claim 5, wherein the heating means for heating the evaporation chamber are electrical heating means and the reducing agent is a mixture of water and of urea.

11. The method as claimed in claim 2, wherein a flow rate of exhaust gas is measured or estimated in the exhaust line, the nitrogen oxides discharged from the combustion engine into the exhaust line being estimated as a function of this measured or estimated flow rate, a total quantity of ammonia in gaseous form being estimated in a determined time interval for reducing the quantity of nitrogen oxides discharged during this time interval in the exhaust line, the total quantity of ammonia in gaseous form being injected as a succession of quantities of ammonia in gaseous form at given instants in the time interval.

12. The method as claimed in claim 3, wherein a flow rate of exhaust gas is measured or estimated in the exhaust line, the nitrogen oxides discharged from the combustion engine into the exhaust line being estimated as a function of this measured or estimated flow rate, a total quantity of ammonia in gaseous form being estimated in a determined time interval for reducing the quantity of nitrogen oxides discharged during this time interval in the exhaust line, the total quantity of ammonia in gaseous form being injected as a succession of quantities of ammonia in gaseous form at given instants in the time interval.

13. A device for injecting ammonia in gaseous form into an exhaust line of a combustion engine, the device comprising a control supervisor, an evaporation chamber incorporating heating means for heating a quantity of reducing agent thus releasing ammonia in gaseous form that exits the evaporation chamber via a pipe opening into the exhaust line, the device implementing a method as claimed in claim 2, wherein the control supervisor is associated with an internal first pressure sensor housed in the evaporation chamber and with a second pressure sensor intended to be housed in the exhaust line, comprising calculation means for calculating a quantity of ammonia to be injected into the exhaust line at a given instant as a function of the pressure values from the first and second pressure sensors.

14. A device for injecting ammonia in gaseous form into an exhaust line of a combustion engine, the device comprising a control supervisor, an evaporation chamber incorporating heating means for heating a quantity of reducing agent thus releasing ammonia in gaseous form that exits the evaporation chamber via a pipe opening into the exhaust line, the device implementing a method as claimed in claim 3, wherein the control supervisor is associated with an internal first pressure sensor housed in the evaporation chamber and with a second pressure sensor intended to be housed in the exhaust line, comprising calculation means for calculating a quantity of ammonia to be injected into the exhaust line at a given instant as a function of the pressure values from the first and second pressure sensors.

15. A device for injecting ammonia in gaseous form into an exhaust line of a combustion engine, the device comprising a control supervisor, an evaporation chamber incorporating heating means for heating a quantity of reducing agent thus releasing ammonia in gaseous form that exits the evaporation chamber via a pipe opening into the exhaust line, the device implementing a method as claimed in claim 4, wherein the control supervisor is associated with an internal first pressure sensor housed in the evaporation chamber and with a second pressure sensor intended to be housed in the exhaust line, comprising calculation means for calculating a quantity of ammonia to be injected into the exhaust line at a given instant as a function of the pressure values from the first and second pressure sensors.

16. The device as claimed in claim 7, wherein the pipe is intended to open into the exhaust line via a passive injector.

17. The device as claimed in claim 7, wherein the supervisor comprises actuating means for actuating a metering valve for metering reducing agent into the evaporation chamber, the reducing agent metering valve being positioned upstream of an inlet interface for entry into the evaporation chamber.

18. The device as claimed in claim 8, wherein the supervisor comprises actuating means for actuating a metering valve for metering reducing agent into the evaporation chamber, the reducing agent metering valve being positioned upstream of an inlet interface for entry into the evaporation chamber.

19. The device as claimed in claim 6, wherein the heating means for heating the evaporation chamber are electrical heating means and the reducing agent is a mixture of water and of urea.

20. The device as claimed in claim 7, wherein the heating means for heating the evaporation chamber are electrical heating means and the reducing agent is a mixture of water and of urea.

* * * * *